United States Patent [19]

Casey Jr.

[11] Patent Number: 4,874,514
[45] Date of Patent: Oct. 17, 1989

[54] TUBULAR ELEMENT FOR REVERSE OSMOSIS WATER PRUIFICATION

[75] Inventor: Walter P. Casey Jr., Las Vegas, Nev.

[73] Assignee: Wetco of Delaware, Inc., Decatur, Ga.

[21] Appl. No.: 622,499

[22] Filed: Jun. 20, 1984

Related U.S. Application Data

[63] Continuation-in-part of Ser. No. 567,184, Dec. 30, 1983, Pat. No. 4,715,952, which is a continuation of Ser. No. 357,213, Mar. 11, 1982, abandoned.

[51] Int. Cl.$^4$ .............................................. B01D 13/01
[52] U.S. Cl. .......................... 210/321.87; 210/323.2; 210/497.1; 210/506
[58] Field of Search ................... 210/489, 490, 497.01, 210/497.1, 506, 509, 321.1, 323.2, 433.2, 321.83, 321.87

[56] References Cited

U.S. PATENT DOCUMENTS

| | | | |
|---|---|---|---|
| 3,133,132 | 5/1964 | Coeb et al. | 264/207 X |
| 3,344,214 | 9/1967 | Manjikian | 264/217 |
| 3,457,170 | 7/1969 | Havens | 210/490 X |
| 3,616,929 | 11/1971 | Manjikian | 210/321.1 |
| 3,834,546 | 9/1974 | Brun et al. | 210/490 X |
| 3,929,945 | 12/1975 | Thayer et al. | 264/41 |
| 4,177,031 | 12/1979 | Thayer et al. | 264/41 |

Primary Examiner—Richard V. Fisher
Attorney, Agent, or Firm—Edward J. Quirk

[57] ABSTRACT

An element for a reverse osmosis water purification cartridge consists of a long rigid plastic tube having peripheral V-shaped grooves along its length. A nylon monofilament is helically wrapped along the length of the element with wrap spacings of about ⅓-⅔ of the fiber diameter. The element is formed by placing liquid membrane-forming material on the wrapped tube; the membrane intrudes 1-2 mils between the adjacent wraps of monofilament.

12 Claims, 1 Drawing Sheet

TUBULAR ELEMENT FOR REVERSE OSMOSIS WATER PRUIFICATION

RELATIONSHIP TO OTHER APPLICATIONS

This application is a continuation-in-part of application Ser. No. 567,184, filed Dec. 30, 1983, now U.S. Pat. No. 4,715,952, which was a continuation of application Ser. No. 357,213, filed Mar. 11, 1982, now abandoned.

BACKGROUND OF THE INVENTION

This invention relates to apparatus for removing impurities from liquids by reverse osmosis, and relates more specifically to a tubular element and a method of mounting the element in a cartridge.

In reverse osmosis purification systems, a pressurized fluid containing one or more undesired components is applied to the surface of a semipermeable membrane which results in a solvent portion of the fluid passing through the semipermeable membrane and a preponderance of the undesired components becoming more concentrated at the membrane surface. Reverse osmosis systems have been used for many purposes, including the provision of relatively small amounts of purified water for home usage. These systems have frequently employed one or more suitably housed membrane elements which are continuously contacted with mineral-containing water. Purified water (which may be thought of as a solvent) slowly permeates through the membrane and is collected in a storage tank, such as a bladder tank, for use on demand.

A variety of different supports for the semi-permeable membrane and housings for the membrane elements have been used. Membrane elements frequently comprise a rigid tubular member around which is wrapped a spacing screen. A thin semipermeable membrane is then formed over the screen by casting or dipping the tubing into a solution of membrane-forming liquid, such as a cellulose acetate solution. Water passes through the cellulose acetate membrane and the screen, entering a center portion of the support tube, e.g., through perforations along the tube; pure water exits one end of the tube. Various methods and apparatus for applying semipermeable membrane layers to tubular units are known and form no part of the present invention. Examples of such methods are found in Thayer et al, U.S. Pat. Nos. 3,929,945, and 4,177,031. Similarly, any semipermeable membrane film may be used in the apparatus of the invention, including the cellulose acetate films disclosed in Loeb et al, U.S. Pat. No. 3,133,132, and Manjikian, U.S. Pat. No. 3,344,214. Brun et al, U.S. Pat. No. 3,834,546 discloses a flexible reverse osmosis element having a textile sheath support for a membrane, which may consist of a helical filament wound around a bundle of yarns.

This particular invention is concerned with a specific tubular semipermeable membrane element and methods of making and mounting the same. The element consists of an elongate rigid tube member having a plurality of longitudinal channels or grooves extending along the entire length of the tube. The tube has a monofilament having a diameter of about 5 mils helically wrapped with about 2-3 mil spacing around its exterior surface. A semipermeable membrane film is mounted on the monofilament surface by applying a liquid solution of membrane-forming materials thereto in any conventional manner, e.g. by extrusion, casting, or dipping, and permitting the solvent to evaporate to leave a thin, rigid, relatively uniform film. The membrane support is manufactured by cutting a plurality of V-shaped grooves into the tube, and wrapping monofilament around the tube, e.g., on a lathe.

In the past, membranes have been cast or otherwise fixed over a base generally comprising a fabric or fibrous material. Because the base material has a plurality of "ends" which may extend randomly through the membrane after casting, a relatively high failure rate caused by imperfections or "holidays" in the membrane surface has been realized. The monofilament base of the present invention has led to a failure rate of elements well below that heretofore realized.

The membrane elements of the invention are particularly adapted for use in relatively small cartridges which are suited for home use. The housing is designed to provide as much membrane surface area as is practical for each unit of volume of the housing; this permits a relatively small unit which may be placed, for example, under a kitchen sink, but which still provides relatively high throughput. In addition, the housing design is particularly adapted to provide internal flow of impure water around the membrane elements to insure that impurities are swept away from the surface efficiently. The housing also includes a safety system to prevent the possibility of back pressure from a pressurized purified water tank from damaging the membrane in the event of a failure of line pressure of the impure water source. Since membrane elements must be replaced after certain periods of use, the cartridge of the invention is also designed for easy installation and replacement.

Accordingly, it is an object of the invention to provide a reverse osmosis membrane element which is easy to manufacture, has a relatively high throughput, and is subject to a relatively low failure rate. It is another object of the invention to provide a membrane element having very carefully selected dimensions to permit maximum throughput while minimizing the potential for fatal flaws in the membrane surface. It is still another object of the invention to provide a mounting system for elements of the invention which is easily fabricated, and which permits easy installation and replacement of elements. These and other objects of the invention are recognized by the invention, a preferred embodiment of which is discussed herein.

SUMMARY OF THE INVENTION

In a preferred sense, the invention comprises a membrane element having a base member comprising an elongate rigid plastic tube having a plurality of parallel grooves extending longitudinally along the surface thereof, an inert monofilament wrapped helically around the exterior surface of the tube, and a semipermeable membrane film supported on the monofilament. The monofilament wrappings are spaced from each other to permit purified water passing through the membrane to pass also through the wrappings and into the collecting grooves. The elements are prepared by cutting a plurality of parallel V-shaped grooves along the surface of a plastic tube, helically wrapping a monofilament member around the exterior surface of the groove leaving spaces between adjacent wraps, fastening the monofilament ends to the tubing member, and forming a film of semipermeable membrane around the entire exterior surface of the tube.

BRIEF DESCRIPTION OF THE DRAWINGS

The invention is best understood with reference to the drawings, in which.

DETAILED DESCRIPTION OF A PREFERRED EMBODIMENT

Figure 1:
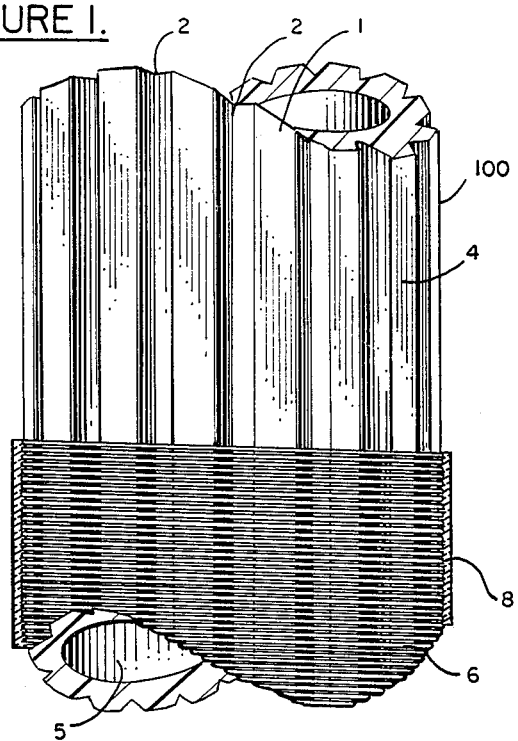
FIG. 1 is a partial view of the exterior of a membrane element of the invention, with a portion of the membrane and support cut away.
Figure 2:
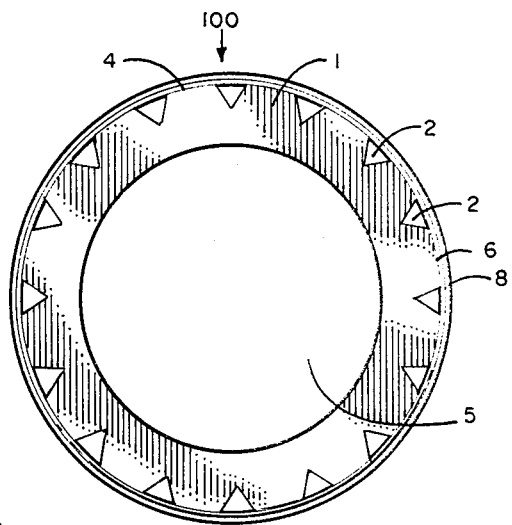
FIG. 2 is an end view of a membrane element of the invention.

The membrane elements, which are used in bundles mounted in cartridges to purify liquids such as water are elongate tubular members designated generally as 100 in FIGS. 1 and 2. Each element consists of a long hollow polyvinyl chloride (PVC) tube 1 having a plurality of parallel grooves or channels 2 located around the external periphery thereof. As shown, the grooves are straight and have a V-shaped cross-section, and extend along the entire length of the tube. Typical tubes used in cartridges for household use have lengths of about 12" to 24", with a 7/16" outside diameter and a $\frac{1}{4}$" inside diameter. The wall thickness of the tube is not critical but should be sufficient to maintain the structural strength and rigidity of the tube. The grooves are about 0.02" deep. The tubes must be rigid in order to prevent adjacent tubes from touching each other; if adjacent tubes are too close or actually touching, a "dead" area is created and a salt deposit may be created. These salt deposits tend to build and substantially shorten membrane life.

Figure 3:
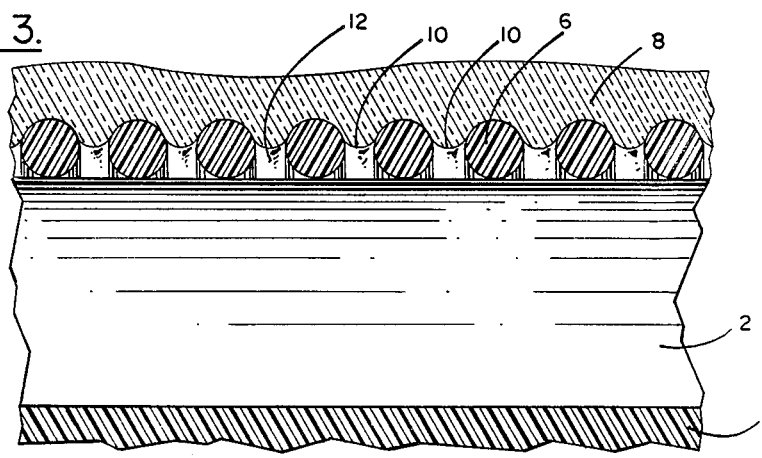
FIG. 3 is a greatly enlarged partial section view of a membrane element of the invention.

A nylon monofilament strand 6 is helically wrapped around the exterior surface 4 of the tube 1. The filament is wrapped to provide a generally uniform spacing 12 between each wrap around the tube. It has been found that the particular ratio of the diameter of the strand to the spacing between the strands is critical for optimum operation of the elements. In general, the spacing between the strands should be at least $\frac{1}{3}$, and preferably at least 40% of the strand diameter; the spacing between the strands should also not exceed about $\frac{2}{3}$ of the strand diameter and preferably should not exceed 60% thereof. Conceptually, the problems created by improper strand spacing are best visualized by viewing FIG. 3. This figure shows 5 mil. nylon strand 6 wrapped around the exterior surface 4 of the tube. The spacing between the strands is about 2.5 mils. A membrane having a thickness of about 3-5 mils is applied to the exterior surface of the tube by conventional technology, such as extrusion, casting, or dipping. Application of the relatively viscous membrane-forming solution provides a slight intrusion 12 into the channels or spaces 12 between the helical wrap of monofilament. Since the membrane material is applied as a liquid, the degree of intrusion of the liquid between the strands is critical to form a functional membrane. It has been found that if the spacing between the strands of the helical wrapping is too wide, (generally greater than $\frac{2}{3}$ of a strand diameter), the liquid membrane material creeps in between the strands and sticks to the element during the membrane forming process. This is particularly true where a membrane is placed on the helical surface by casting, and the element is placed in water to cure the membrane immediately after its application. When the membrane is placed in water, the water moves relatively slowly along the inside of the grooves by capillary action, and therefore does not support the entirety of membrane-forming fluid on the inside of the grooves. Accordingly, water pressure on the exterior of the liquid membrane material forces this liquid material into the grooves, thereby caving in the membrane. In this case, the liquid membrane material blocks the grooves, thereby destroying the effectiveness of the element for its intended purpose. Also, if the spacing is too large, variations in the temperature or viscosity of the casting solution can result in intrusion of the of the solution directly into the grooves of the tubular support. On the other hand, if the spacing between the element strands is too narrow, flow of purified water into the grooves through the membrane is seriously impeded because the effective membrane area is decreased. Additionally, it has been found that most monofilament strand material expands slightly upon contact with water, and therefore even if the filament is wrapped with a uniform narrow spacing when the filament is dry, subsequent swelling may actually close the spaces between the membrane.

The preferred monofilament material has been found to be nylon. Nylon is strong, and stretches slightly during the wrapping process, and therefore tends to stay in place on the tubular support. Nylon is easy to wrap evenly and uniformly, and does not break. An example of a commercially available nylon monofilament is Shakespear Wonder Thread SN 38 monofilament having a diameter of 5 mils. This material is particularly easy to wrap because it is not resilient after the wrapping is complete and the end of the filament is cut; therefore, the end of the monofilament tends to stay in place with little restraint at the end of the tube. As noted earlier, however, nylon swells slightly (as much as 9%) upon contact with water and therefore must be spaced very carefully along the tubular support.

As previously pointed out, the dimensions of various features of the invention are critical. The reasons for the importance of these dimensions are the fact that reverse osmosis purification units must meet certain important criteria to be commercially feasible. The most important of these criteria, which must each be balanced with the others, are size, flux, and water purity. Reverse osmosis units are generally used in households, and are placed beneath a sink. Therefore, these units are subjected to severe size restraints and must be able to fit comfortably underneath a relatively small sink. Yet the water produced by such unit must be pure, and must be in sufficient volume to be useful to the homeowner. This means that the flow of water through each element must be maximized consistent with water purity standards. If, to increase flux, membranes are made thinner, the chances of a void or "holiday" in the membrane increases. If the membrane is defective and passes impure water, the entire cartridge is of course rendered ineffective. For these reasons, the design of the membrane element is quite critical and very delicate.

Even the diameter of the structural supporting tube is important. In general, it has been found that an outside diameter of about $\frac{3}{8}$" to about $\frac{1}{2}$" is acceptable. If the tube diameter is too small, the element cannot be cast properly on the tube to obtain a uniform element thickness. If the tube diameter is larger than about $\frac{1}{2}$", packing density in a cartridge is lost. With regard to the membrane, acceptable membrane thicknesses are about 3-6 mils, preferably 4-5 mils. If the membrane is too thick, the flux through the membrane is too small, and the membrane tends to compact in service. Cellulose acetate membranes have a very thin active layer or skin which effects the separation of water from impurities. The material underneath this skin simply adds strength to the membrane. If the membrane is thicker than about 6 mils, the soft material under the skin compacts and causes an undesirable flux decrease. If a membrane is thinner than about 3 mils, it loses strength and although the flux is increased, quality decreases.

To support the membrane, the monofilament should have a circular cross-section having a diameter of about 4–6 mils. Within the ratio parameters previously set forth, the spacing between the strands should be about 2–3 mils (therefore placing the centers of adjacent wraps of monofilament approximately 7–8 mils apart). It is found that this particular configuration of membrane, filament, and spacing provides an optimum balance of flux, membrane strength, water purity, membrane reliability and packing density.

In the optimum design previously discussed, compaction of the relatively viscous membrane-forming solution provides a slight intrusion 10 into the channels or spaces between the helical wraps of the monofilament. As best seen in the greatly enlarged section view of the tubing shown in FIG. 3, the membrane is thicker at the locations 12 where the membrane extends into the channels between the monofilament, the intrusions being designated by numeral 10. In actual practice, with the optimum spacings set forth above, the basic membrane is about 3–5 mils thick, with at least 1 mil, and frequently as much as 2 mils, of intrusion between the monofilament wraps (i.e., from the top surface of the monofilament).

The tube elements of the invention are easily manufactured by cutting the elongate parallel grooves along the length of conventional PVC tubing, wrapping the monofilament around the tube with a lathe, wrapping machine, or otherwise, and fixing the ends of the monofilament wrap such that the monofilament will not unwind upon usage. The loose monofilament ends can be easily attached in place by tying the ends, applying a cap, or fastening with an adhesive, for example a very small amount of adhesive may be applied at each end of the tube to hold the end in place. Any suitable adhesive may be used; a viscous hot-melt thermoplastic or other adhesive which does not penetrate very far into the cavities between the fiber strands is preferred. Suitable hot-melt adhesives are marketed by 3M company and United Shoe Company; no invention in the glue or method of attaching the end of the strand is claimed. A very fast drying non-viscous liquid adhesive such as Loctite Super Bonder 430 may also be used. A single drop of such liquid placed at each end of the tube during the wrapping process enables the wrapping to proceed rapidly without interruption. If the preferred nylon monofilaments are used which hold their position after wrapping and cutting, application of the viscous membrane solution will itself hold the ends of monofilament in place.

Figure 4:
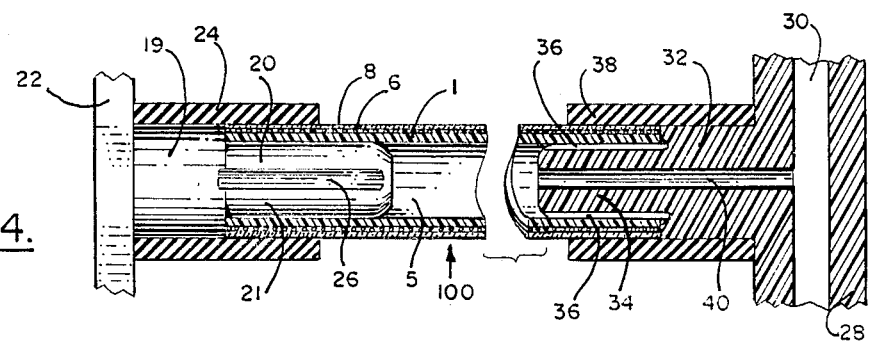
FIG. 4 s a partially sectioned view showing the membrane element of invention mounted in a cartridge.

FIG. 4 shows a preferred method of mounting the tubular elements of the invention and also illustrates the manner in which these elements function. Each tubular element 100 is mounted in a cartridge (not shown) having an end portion 22 with a molded projecting plug 20 which functions to seal one end of the element. The plug has a base portion 19 of circular cross-section, and a forward nipple portion 21 adapted to mount the tubular element. The element is connected to the plug by means of a sleeve 24 fabricated from flexible rubber or other elastomer which slides over the exterior of the plug base 19 and the end of the tube 100. The nipple 21 extends into the interior channel 5 of the tubular member. Each nipple 21 has four peripheral uniformly spaced slots or grooves 26 in its exterior surface. Accordingly, water passing through the membrane 8 and into the interstices 12 between the monofilament wraps travels between the wraps to the end of the tube, through the grooves 26, and into the interior channel 5 of the tubular element.

The other end of the tube is similarly mounted on a header 28 which includes a collection chamber 30 to collect the purified water produced by the various elements in a cartridge. The header also comprises plug 32 having a nipple portion 34 extending inwardly into the tubular element. Nipple 34, which is shown in section in FIG. 4, also has 4 equally spaced peripheral grooves 36 to receive purified water reaching the end of the element by travelling between the wraps of the helical membrane support. A similar elastomeric sleeve 38 retains the element in place on the plug. An axially located conduit 40 extends through the nipple and plug into the collection chamber, thereby providing a channel for passage of all of the purified water which collects in the hollow interior 5 of the element. Accordingly, the passage of purified fluid is first through the membrane 8, into the grooves between the helical wraps 12, along the parallel channels to the ends of the tubing, through the conduit 40 in the plug, and into the collection chamber 30.

If desired, the interior 5 of the membrane element tube may be packed with further purification material, such as granular bacteriostatic activated carbon. Suitable material, which is sold under the name Hygene by Ionics, Inc., is activated carbon having about 1% metallic silver to impart a bacteriostatic effect.

The invention has been described with reference to a preferred embodiment thereof, but should not be limited by the foregoing description. Within the parameters set forth for criticality of the invention, modifications may be made which would be apparent to those skilled in the art. Accordingly, the invention should be defined by the following claims only.

I claim:

1. An element for reverse osmosis purification of an aqueous fluid comprising a rigid, impermeable, straight, elongate, hollow cylindrical tubular member, said member having a plurality of substantially parallel grooves circumferentially spaced around the external periphery of the tubular member, each groove extending substantially the entire length of the tubular member, a single elongate fiber having a substantially circular cross-section wrapped helically around the external periphery of the tubular member substantially along the entire length of said member, each turn being substantially uniformly spaced apart from each adjacent turn by a distance of from about ⅓ to about ⅔ of the fiber diameter, and a reverse osmosis membrane supported on the fiber.

2. The element of claim 1 wherein the grooves has a uniform v-shaped cross-section.

3. The element of claim 1 wherein the spacing between adjacent turns is from about 0.4 to about 0.6 of the fiber diameter.

4. The element of claim 1 wherein the fiber diameter is from about 4 to about 6 mils.

5. The element of claim 4 wherein the spacing between adjacent turns is from about 2 to about 3 mils.

6. The element of claim 1 wherein the membrane extends from 1-2 mils downwardly into the spacing between the strands.

7. The element of claim 1 wherein the tubular member has an outside diameter of from about ⅜" to about ¼".

8. The element of claim 1 wherein the membrane is from about 3 to about 6 mils thick.

9. The element of claim 1 wherein the fiber is nylon.

10. A method of manufacture of membrane elements for reverse osmosis water purification comprising forming of elongate parallel grooves along the entire length of an elongate rigid plastic hollow tubular member, wrapping a single strand of monofilament nylon helically around the entire periphery of the tubular member leaving a spacing of about 2-3 mils between adjacent urns, attaching the ends of the strand to the tubular member, casting a liquid membrane-forming material on the exterior of the wrapped tubing, and inserting the entire element into water to cool and cure the membrane.

11. In combination, an element for reverse osmosis purification of an aqueous fluid comprising a rigid, impermeable straight, elongate, hollow cylindrical tubular member, said member having a plurality of grooves circumferentially spaced around the external periphery of the tubular member, each groove extending substantially the entire length of the tubular member, a single elongate fiber having a substantially circular cross-section wrapped helically around the external periphery of the tubular member substantially along the entire length of said member, each turn being substantially uniformly spaced part from each adjacent turn by an distance of from ⅓ to ⅔ of the fiber diameter, and membrane separating means supported on the fiber, and mounting means for said element comprising first plug means removably extending axially into the interior of the tubular member at one end thereof, a first passageway for permitting the flow of purified water from the grooves adjacent the first plug means into the interior of the tubular member, second plug means removably extending axially into the interior of the tubular member at the other end thereof, a second passageway for permitting the flow of purified water from the grooves adjacent the second plug means into the interior of the tubular member, a collection chamber for collecting purified water from a plurality of elements, and conduit means for connecting the interior of the tubular member with the collection chamber.

12. The combination of claim 11 wherein the conduit means is an axial conduit extending through the entirety of one of the plug means.

* * * * *